US006970306B2

(12) United States Patent
Matsuo

(10) Patent No.: US 6,970,306 B2
(45) Date of Patent: Nov. 29, 2005

(54) IMAGING LENS

(75) Inventor: Eiki Matsuo, Suwa (JP)

(73) Assignee: Seiko Epson Corporation, (JP)

(*) Notice: Subject to any disclaimer, the term of this patent is extended or adjusted under 35 U.S.C. 154(b) by 0 days.

(21) Appl. No.: 10/761,146

(22) Filed: Jan. 20, 2004

(65) Prior Publication Data

US 2005/0041306 A1 Feb. 24, 2005

(30) Foreign Application Priority Data

Jan. 20, 2003 (JP) .............................. 2003-011239

(51) Int. Cl.[7] .......................... G02B 13/18; G02B 9/14; G02B 9/12

(52) U.S. Cl. ........................ 359/716; 359/785; 359/791

(58) Field of Search ................................ 359/713–716, 359/785, 791

(56) References Cited

U.S. PATENT DOCUMENTS

| | | | | |
|---|---|---|---|---|
| 4,606,607 | A * | 8/1986 | Kurihara | 359/715 |
| 5,251,069 | A | 10/1993 | Iizuka | 359/717 |
| 6,466,377 | B1 | 10/2002 | Saito et al. | 359/661 |
| 6,476,982 | B1 * | 11/2002 | Kawakami | 359/791 |
| 6,560,043 | B1 | 5/2003 | Saito et al. | 359/785 |

FOREIGN PATENT DOCUMENTS

| | | |
|---|---|---|
| JP | 01-245211 | 9/1989 |
| JP | 04-211214 | 8/1992 |
| JP | 2004-004566 | 1/2004 |
| JP | 2004-163786 | 6/2004 |
| JP | 2004-163849 | 6/2004 |
| JP | 2004-212467 | 7/2004 |
| JP | 2004-219807 | 8/2004 |
| JP | 2004-219982 | 8/2004 |

OTHER PUBLICATIONS

Communication from Japanese Patent Office re: related application.

* cited by examiner

*Primary Examiner*—Georgia Epps
*Assistant Examiner*—William Choi
(74) *Attorney, Agent, or Firm*—Harness, Dickey & Pierce, P.L.C.

(57) ABSTRACT

A bright, small, and inexpensive imaging lens system is provided with a short total length that can provide more than a 30 degree viewing angle and whose aberrations are excellently corrected. The imaging lens includes, in order from an object side, a positive first lens with a convex surface facing the object side, an aperture stop provided on the object side or an image side of the first lens, a meniscus second lens with a concave surface facing the object side, and a meniscus third lens with a convex surface facing the object side. Furthermore, at least one of the first lens and the second lens includes an aspheric surface, and the third lens is a biaspheric lens. In addition, the second lens and the third lens have paraxial focal lengths whose signs are different. When ν max and ν min are the maximum Abbe number and the minimum Abbe number among the lenses, respectively, the condition, 1.25<ν max/ν min, is satisfied.

8 Claims, 9 Drawing Sheets diagram of lens structure

IMAGING LENS

RELATED APPLICATIONS

Japanese Patent Application No. 2003-011239 filed on Jan. 20, 2003 is hereby incorporated by reference in its entirety.

BACKGROUND OF THE INVENTION

1. Technical Field of the Invention

The present invention relates to an imaging lens that forms an image of an object on an image receiving surface.

2. Description of the Related Art

Recently, a photographic camera module has come to be provided to portable terminals such as cellular phones. This type of equipment needs miniaturizing of the whole camera module including an optical system, an imaging element, and an image processing device in order to enhance the portability thereof. Regarding imaging elements such as a CCD and a CMOS, a high resolution and small imaging element with miniaturized pixel size has been rapidly spreading. As an optical system responding to such an imaging element, an optical system that satisfies all needs such as small size, low price, high resolution and excellent optical performance is required.

In such an optical system, specific requirements are roughly categorized as below.

low price (the number of lenses is small, resin is available, easy to be formed, and easy to be assembled)

bright (small Fno)

small (specifically, the length from the end of a lens to an imaging element is short)

large angle of view uniform field illumination (vignetting is small, and small incident angle of a light beam to an imaging element)

high resolution (basic aberrations such as a spherical aberration, a coma, a curvature of field, astigmatism, and an chromatic aberration are excellently corrected)

excellent depicting ability (distortion is free, flare is small, and the like)

If an optical system that satisfies all of the above requirements is realized with a small number of lenses, the scope of application thereof greatly spreads. Meanwhile, since the recording density of an imaging element used in a portable terminal and the like has been rapidly increased recently, the situation has come where a lens system formed of one or two lenses that were used in an imaging element initial stage can not obtain sufficient versatility of design and can not satisfy a required specification.

Regarding a two-lens structure, a structure of negative-positive in this order from an object is favorable in view of aberration correction but has a limit of being miniaturized. In the two-lens structure, in order to shorten the total length thereof, a structure of positive-positive or positive-negative is preferable. In addition, in order to keep an incident angle of a light beam to an imaging element small, a structure of “front diaphragm” where an aperture stop is disposed closest to an object in the system is preferable. As examples of the two-lens structure that satisfy such structural requirements among examples that have been proposed, there are examples disclosed in Japanese laid-open publication No. 1-245211 and Japanese laid-open publication No. 4-211214, and an example proposed by the present inventor where a positive lens and a meniscus lens with a concave surface facing an object side are combined.

FIG. 16 is a sectional view of the lens system disclosed in Japanese laid-open Publication No. 1-245211. The lens system is formed of a biconvex positive first lens and a negative meniscus second lens with a concave surface facing an image side. In this example, since the power of the second lens is relatively strong and a surface on the image side thereof is a concave surface, an incident angle of a light beam to an imaging element tends to be large. Therefore, increasing an angle of view is difficult, so that the angle of view in the embodiment also remains at about 20 degrees, which is small.

FIG. 17 is a sectional view of the lens system disclosed in Japanese laid-open publication No. 4-211214. The lens system is formed of an imaging lens 10 disposed on an object side and a correction lens 20 disposed on an image side of the imaging lens 10. In this example, the imaging lens 10 provides almost all power of the whole system and the correction lens 20 disposed on the image side is a biaspheric lens, thereby correcting field aberrations and balancing each aberration when the angle of view is increased. In this structure, since the imaging lens 10 on the object side takes charge of basic imaging operation, if the lens on the object side is formed of a single lens, there is a limit to balance field aberrations only by the correction lens 20 with the incident angle of a light beam to an imaging element being decreased. In addition, since effective correction of chromatic aberration is difficult, the widening of the angle of view is limited.

FIG. 18 shows a combination of a positive lens and a meniscus lens with a concave surface facing an object side that has been proposed by the present inventor. The aberrations of the lens system are balanced and miniaturizing thereof is possible, considering it is a two-lenses. However, the versatility of designing thereof is insufficient to respond to a further increase in resolution of an imaging element.

The present invention is intended to provide a bright, small, and inexpensive imaging lens system with short total length whose aberrations are excellently corrected and that matches an angle of view of over 30 degrees and responds to a need for high resolution.

SUMMARY

In the present invention, the following structures are adopted in order to achieve the above advantages.

First, an imaging lens of the present invention includes, in order from an object side, a positive first lens with a convex surface facing the object side, an aperture stop that is provided on the object side or an image side of the first lens, a meniscus second lens with a concave surface facing the object side, and a meniscus third lens with a convex surface facing the object side. In addition, at least one of the first lens and the second lens includes an aspheric surface and the third lens is a biaspheric lens. The second lens and the third lens have the paraxial focal lengths whose signs are different. Furthermore, when ν max and ν min are the maximum Abbe number and the minimum Abbe number among the lenses, respectively, the condition, $1.25<\nu\ max/\nu\ min$, is satisfied.

Furthermore, in the imaging lens of the present invention, at least one of the first lens and the second lens of the lens system may be a biaspheric lens.

Furthermore, in the imaging lens of the present invention, regarding at least one of a biaspheric lens, when t min and t max are the thicknesses of the thinnest part and the thickest part of the biaspheric lens, respectively, that are measured parallel to the optical axis in the effective diameter in which a light beam goes through, the condition, 1.0<t max/t min<1.4, may be satisfied.

Furthermore, in the imaging lens of the present invention, any aspheric surface of a biaspheric lens may include a plurality of points of inflection in the effective diameter in which a light beam goes through.

Furthermore, in the imaging lens of the present invention, the aperture stop may be provided on the object side of the first lens.

Furthermore, the imaging lens of the present invention may include at least a single resin lens.

Furthermore, in the imaging lens of the present invention, when L and f are the total lengths of the lens system and the focal length of the whole system, respectively, the condition, L/f<2.0, may be satisfied.

An imaging lens of the present invention includes, in order from an object side, an aperture stop, a biconvex positive first lens, a negative meniscus second lens with a concave surface facing the object side, and a positive meniscus third lens with a convex surface facing the object side. In addition, at least one of the first lens and the second lens includes an aspheric surface, and the third lens is a biaspheric lens. Furthermore, when ν1, ν2, and ν3 are the Abbe numbers of the first lens, the second lens, and the third lens, respectively, the condition, 2.5<(ν1+ν3)/ν2, is satisfied.

An imaging lens of the present invention includes, in order from an object side, an aperture stop, a positive first lens with a convex surface facing the object side, a positive meniscus second lens with a concave surface facing the object side, and a negative meniscus third lens with a convex surface facing the object side. In addition, at least one of the first lens and the second lens includes an aspheric surface, and the third lens is a biaspheric lens. Furthermore, when ν3 is the Abbe number of the third lens, the condition, ν3<45, is satisfied.

The above structures can provide an intended imaging lens system.

DETAILED DESCRIPTION

Figure 1:
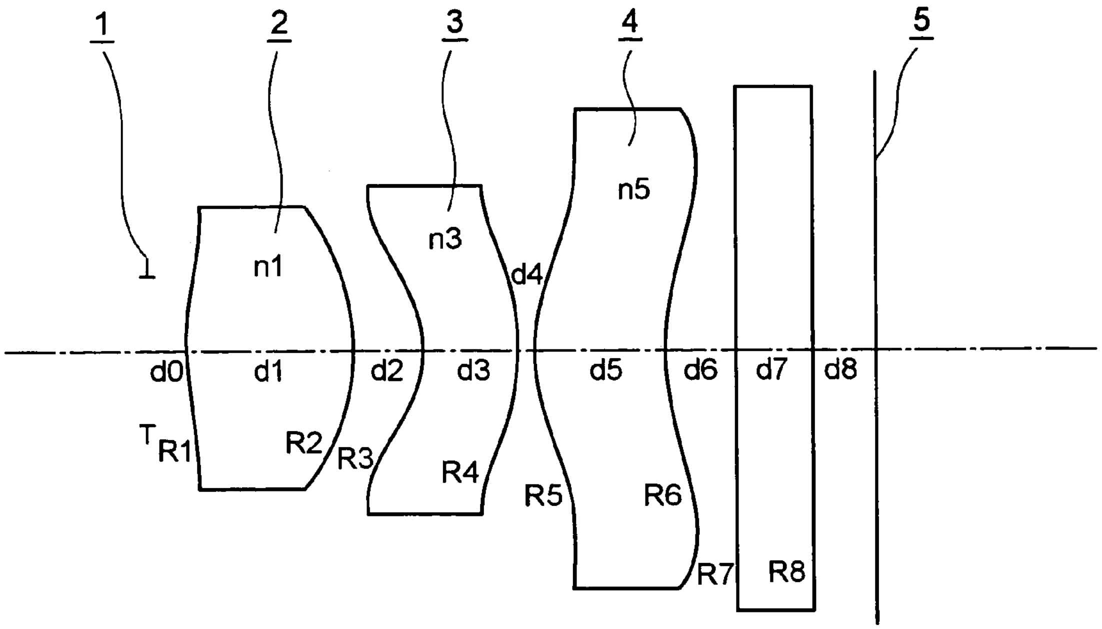
FIG. 1 is a sectional view showing an embodiment of an imaging lens.
Figure 2:
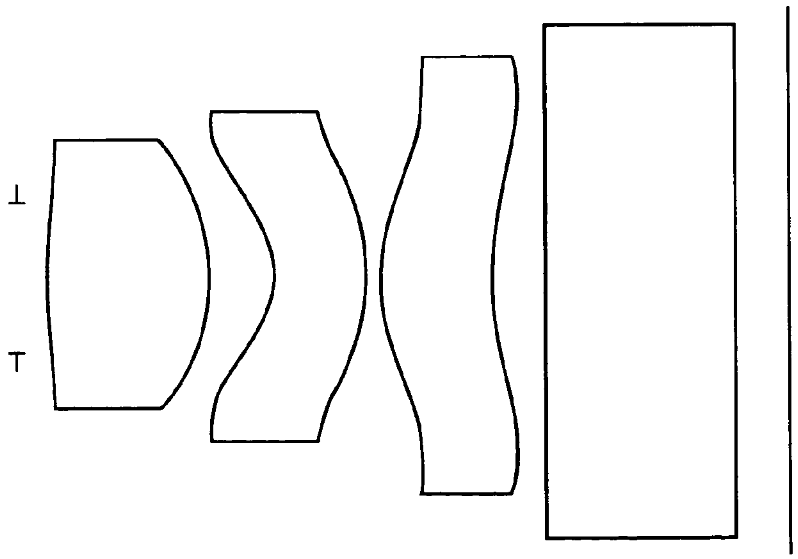
FIG. 2 is an optical sectional view of an example 2.
Figure 3:
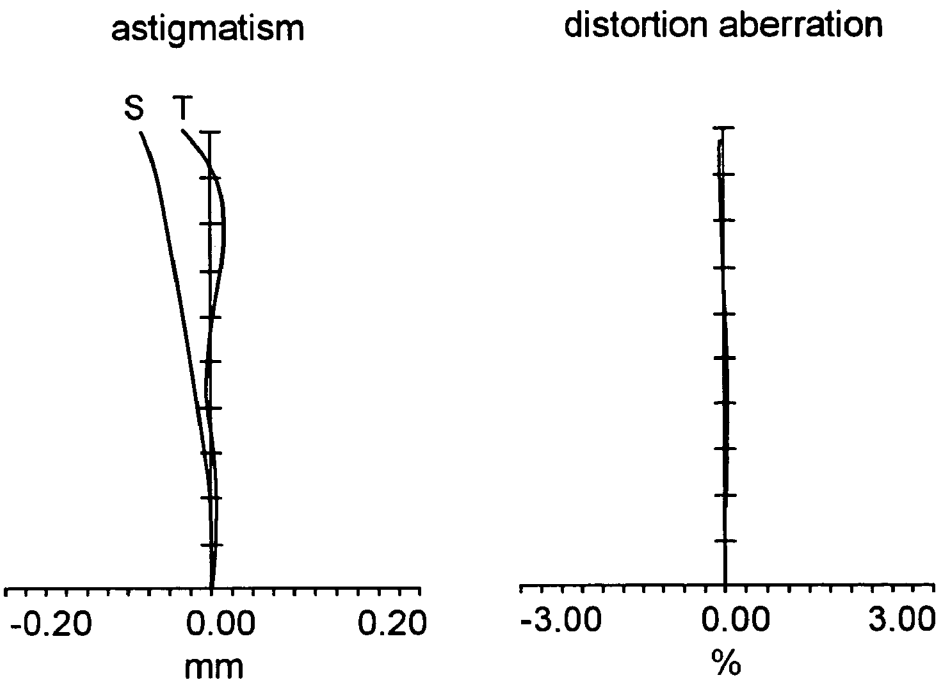
FIG. 3 is a diagram of field aberrations of example 2.
Figure 4:
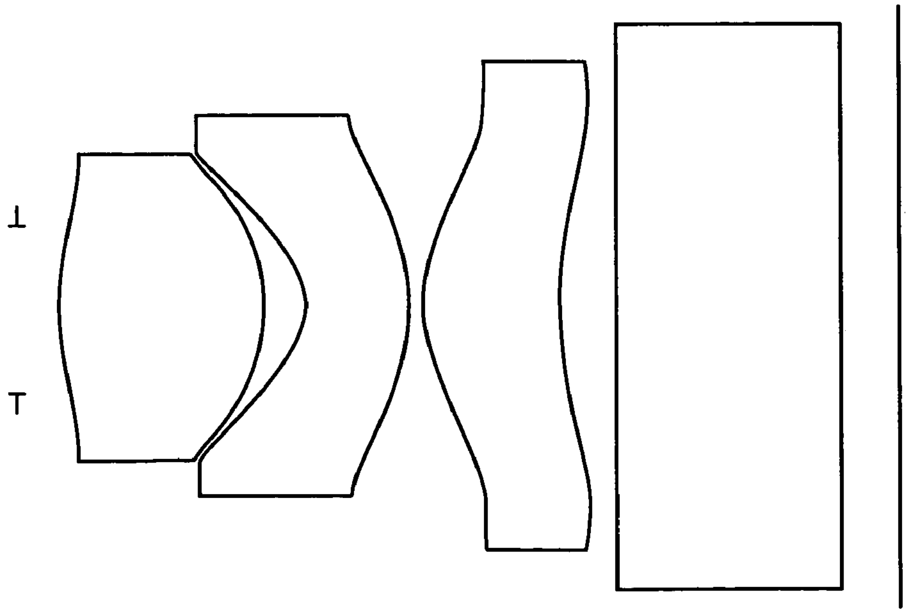
FIG. 4 is an optical sectional view of an example 4.
Figure 5:
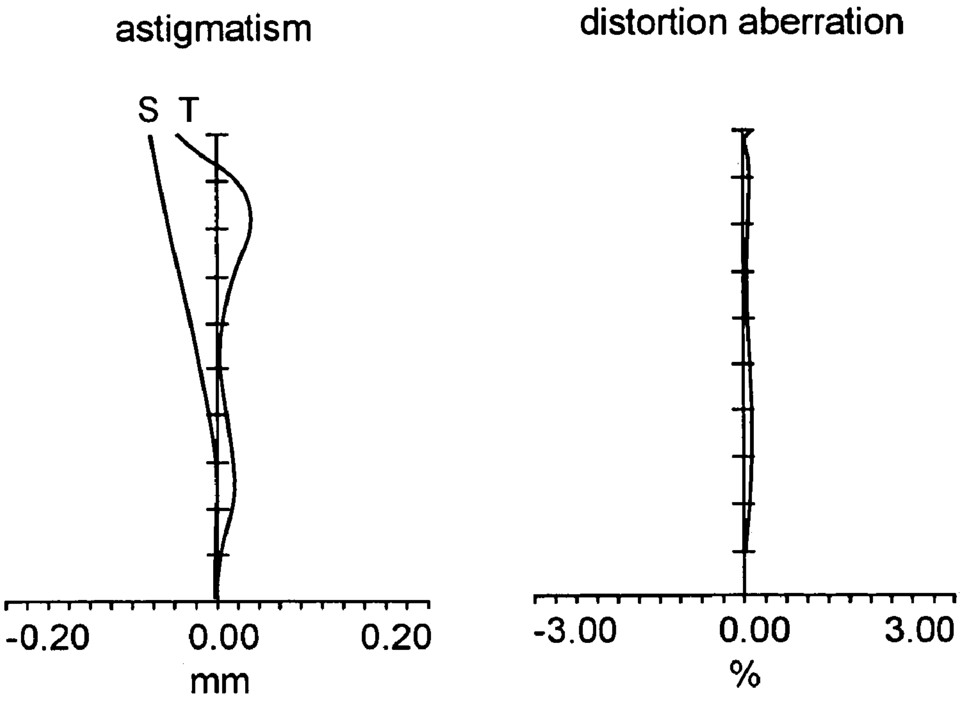
FIG. 5 is a diagram of field aberrations of example 4.
Figure 6:
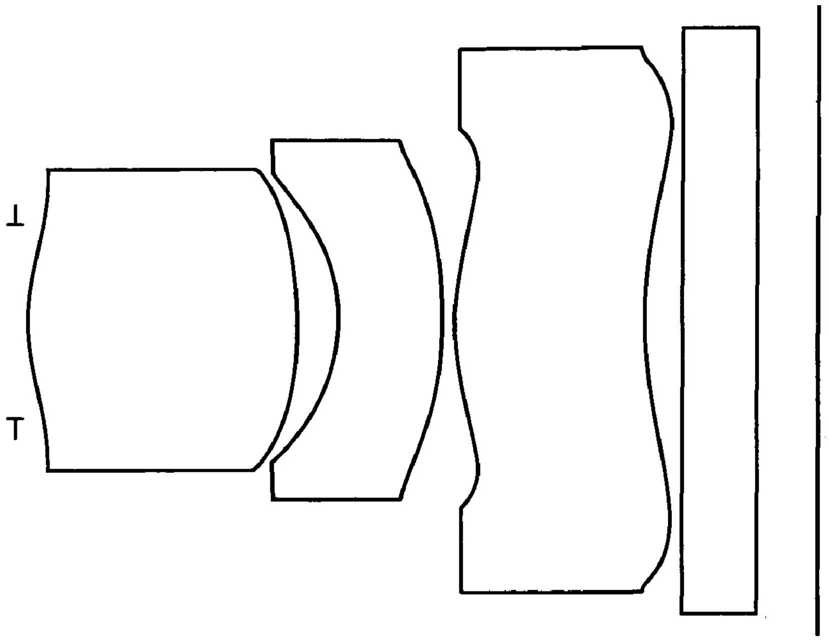
FIG. 6 is an optical sectional view of an example 6.
Figure 7:
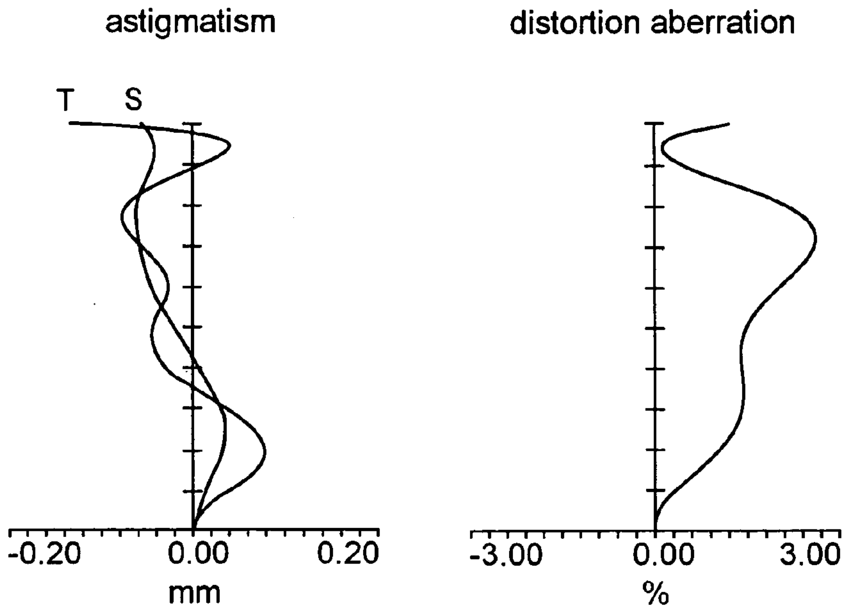
FIG. 7 is a diagram of field aberrations of example 6.
Figure 8:
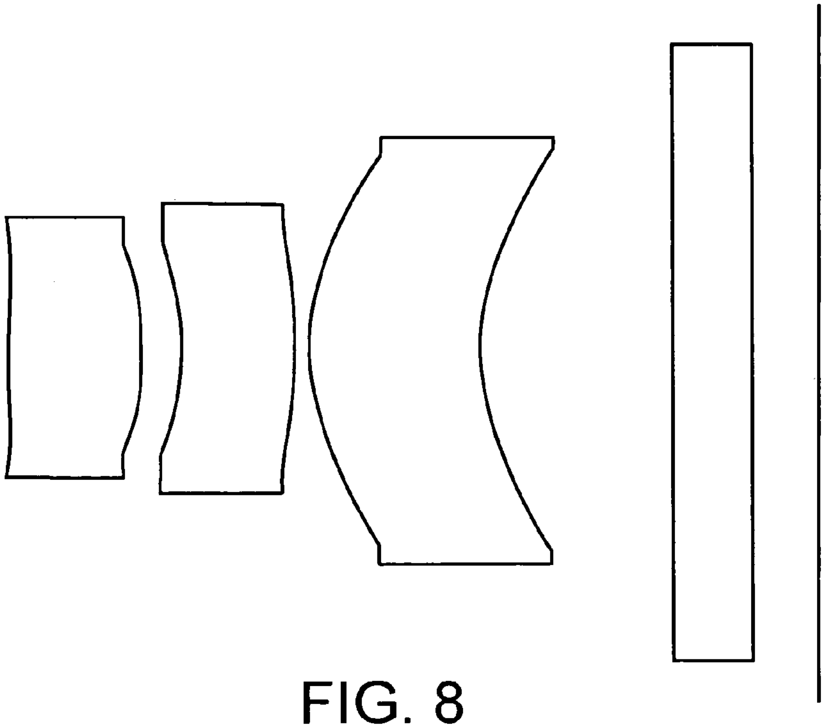
FIG. 8 is an optical sectional view of an example 9.
Figure 9:
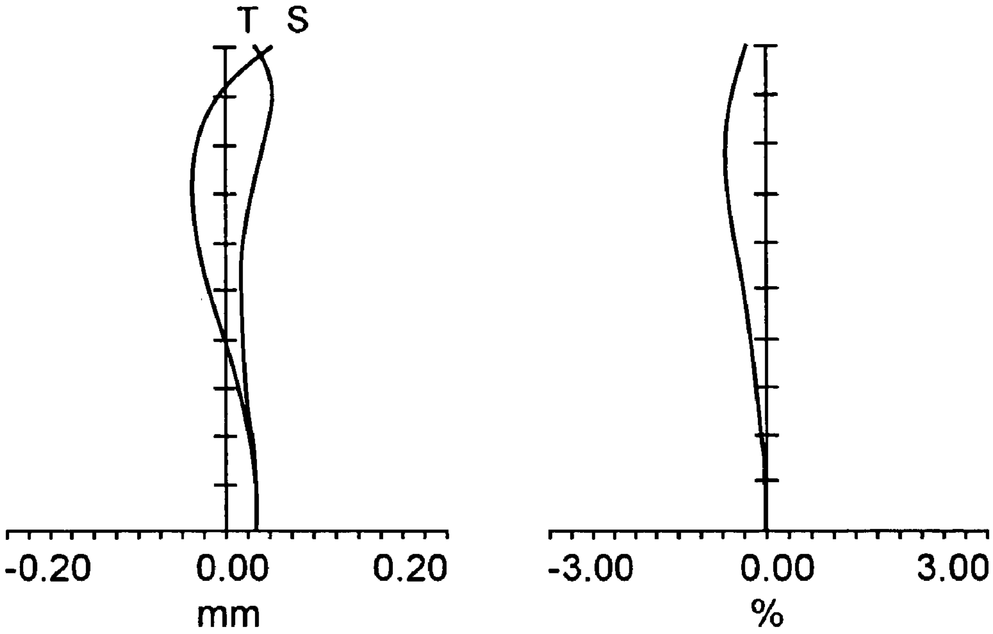
FIG. 9 is a diagram of field aberrations of example 9.
Figure 10:
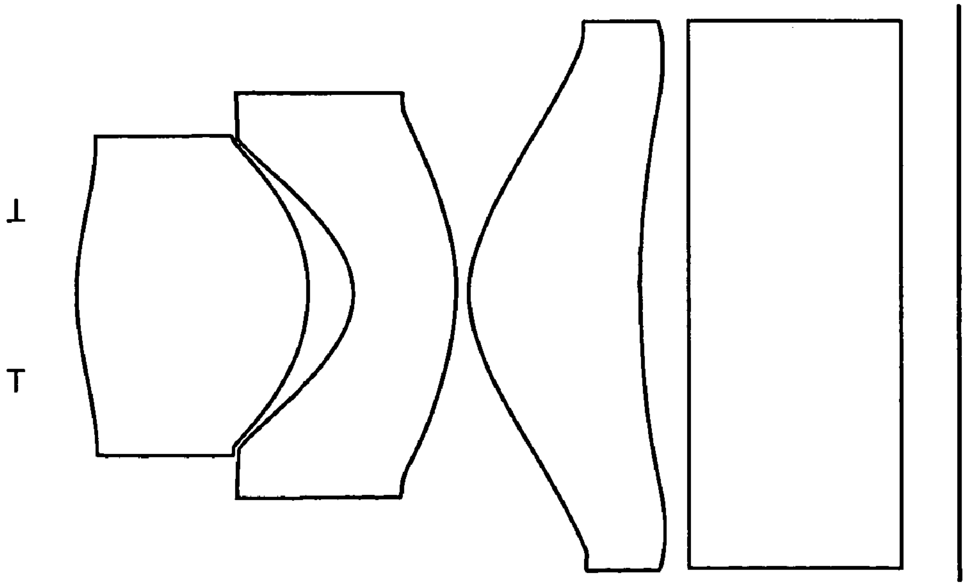
FIG. 10 is an optical sectional view of an example 12.
Figure 11:
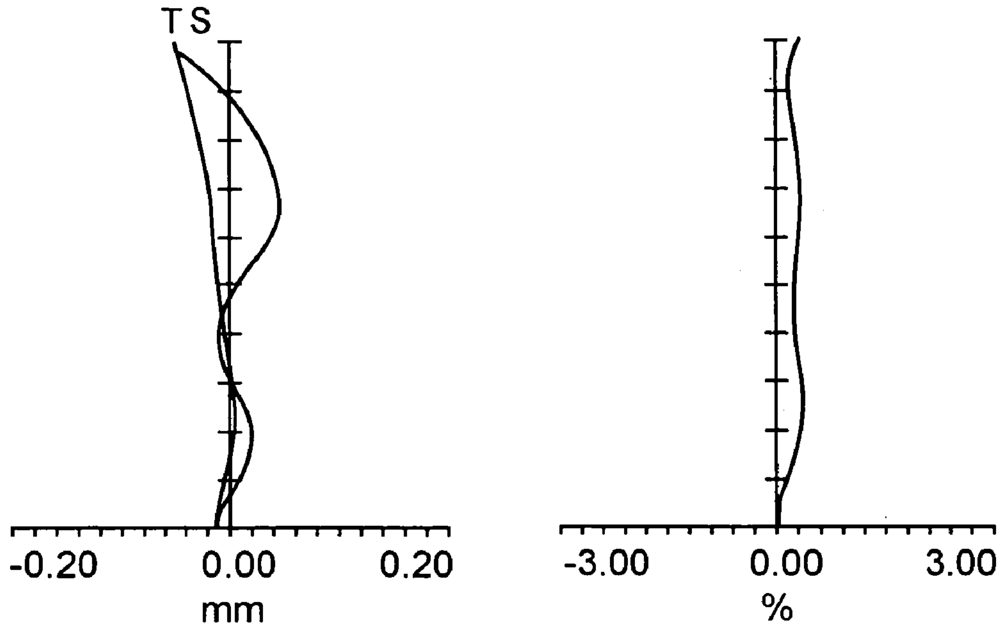
FIG. 11 is a diagram of field aberrations of example 12.
Figure 12:
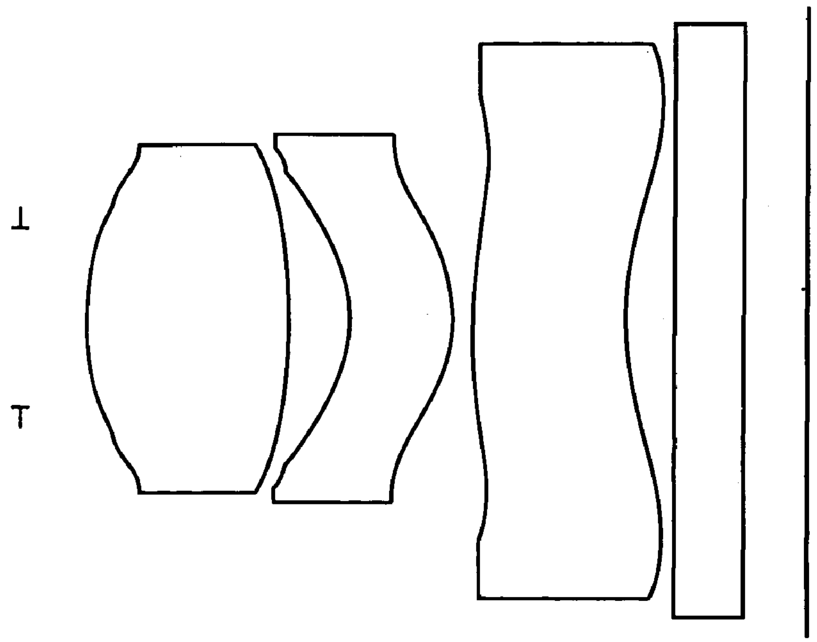
FIG. 12 is an optical sectional view of an example 14.
Figure 13:
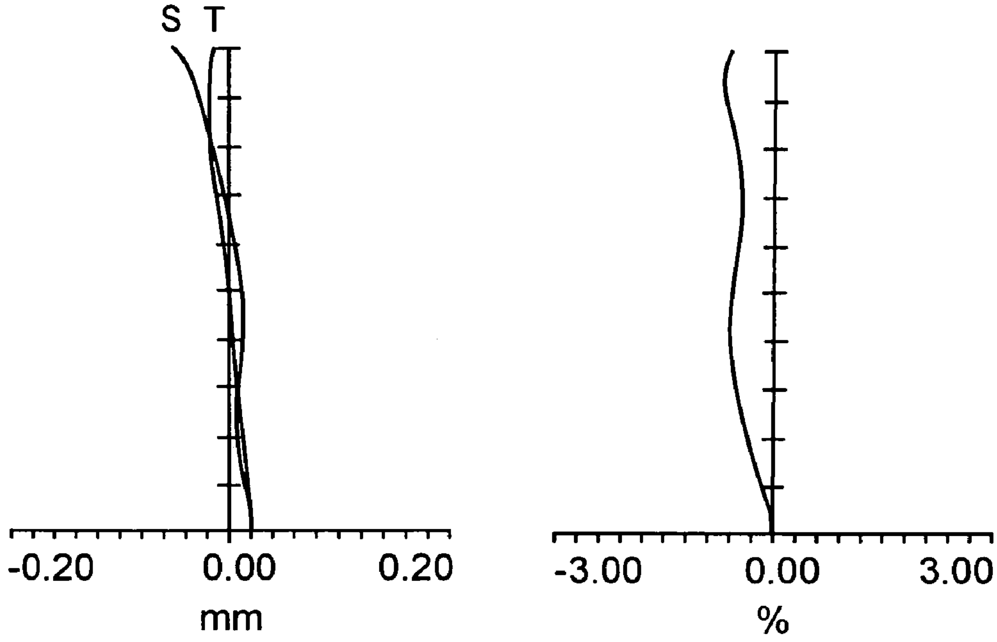
FIG. 13 is a diagram of field aberrations of example 14.
Figure 14:
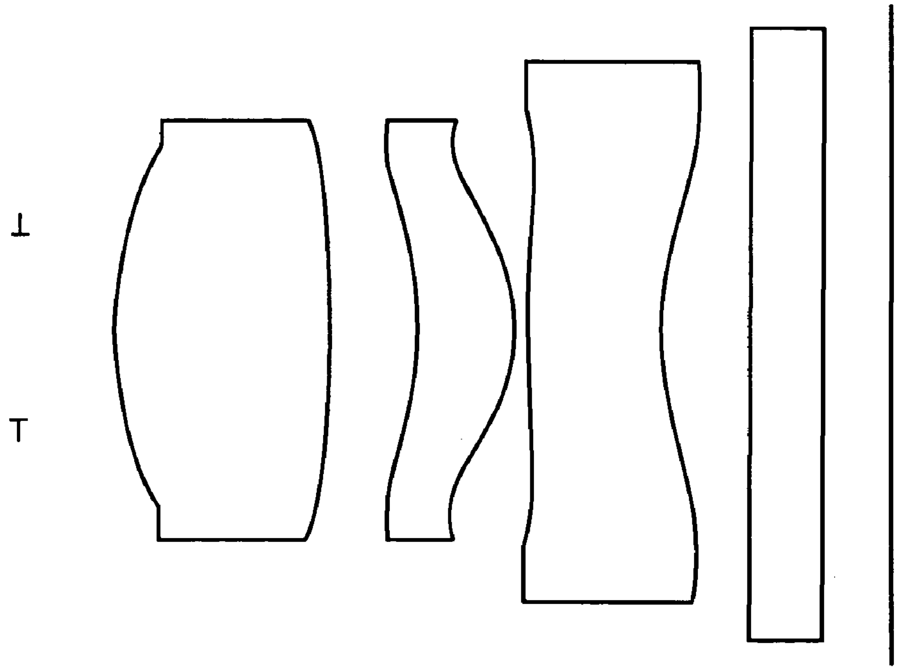
FIG. 14 is an optical sectional view of an example 15.
Figure 15:
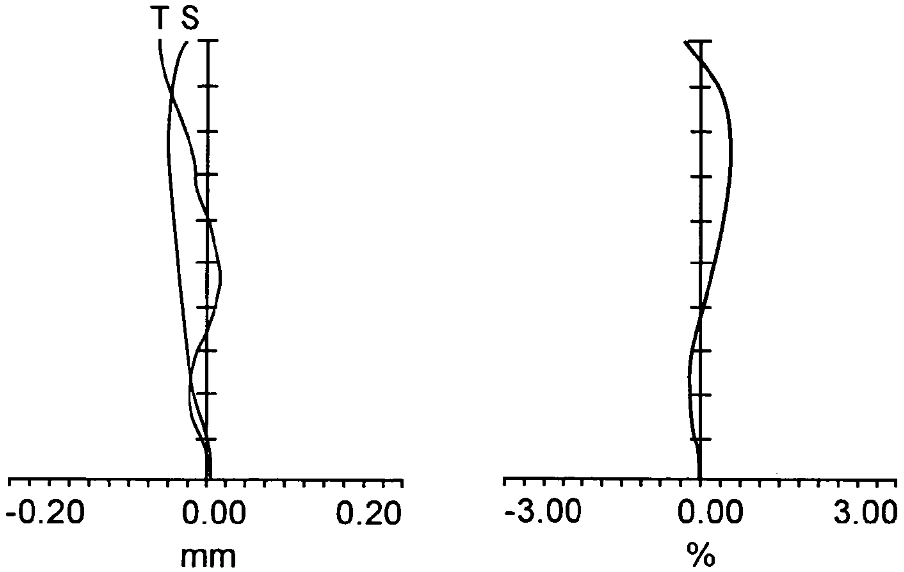
FIG. 15 is a diagram of field aberrations of example 15.
Figure 16:
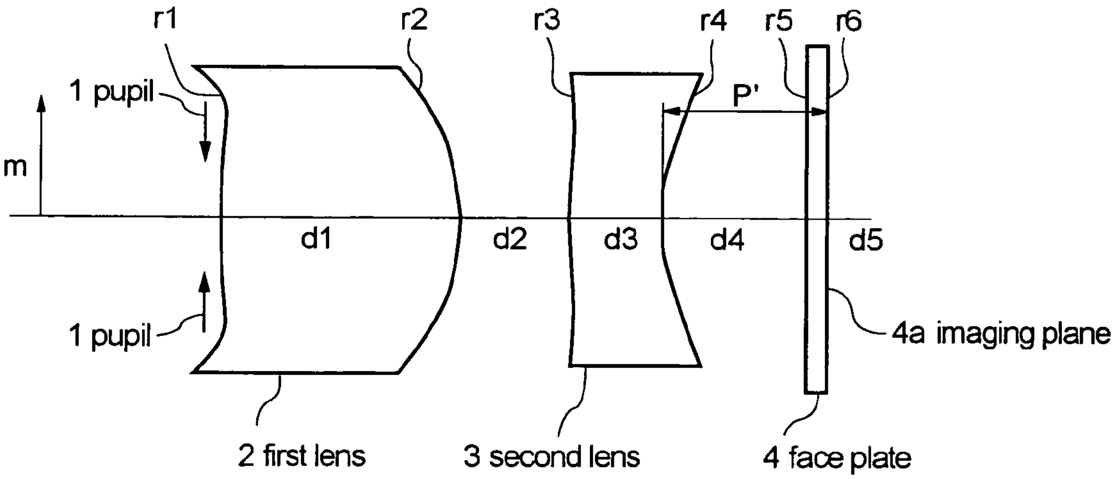
FIG. 16 is a sectional view of a lens system disclosed in Japanese laid-open publication No. 1-245211.
Figure 17:
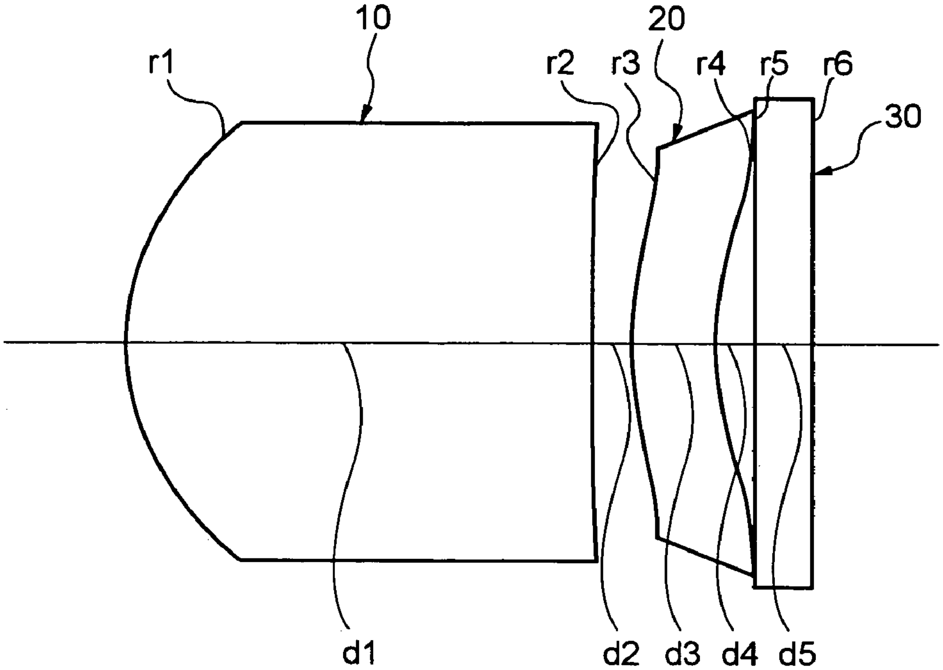
FIG. 17 is a sectional view of a lens system disclosed in Japanese laid-open publication No. 4-211214.
Figure 18:
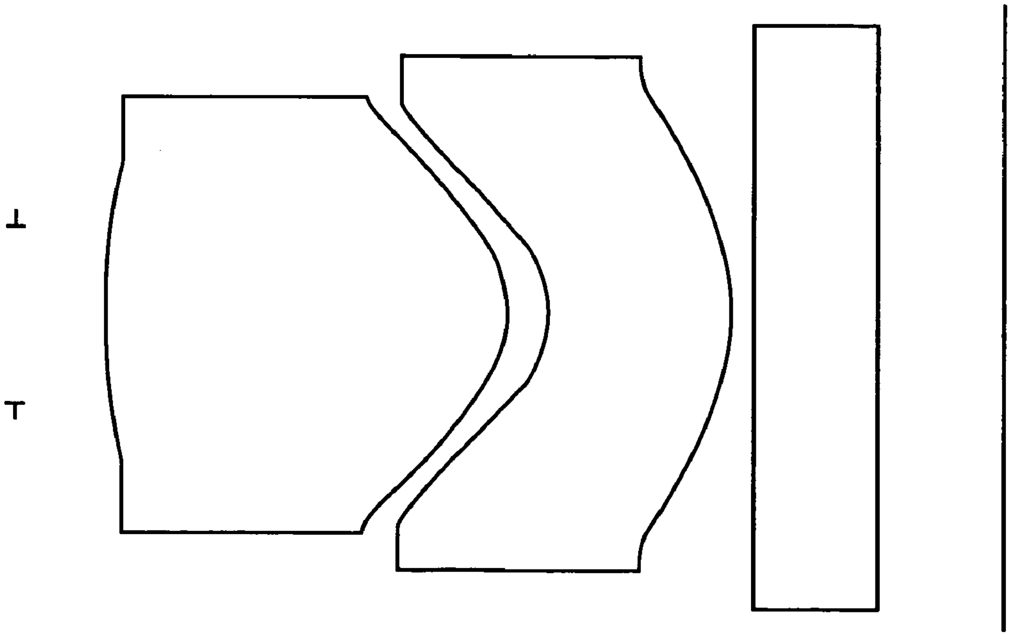
FIG. 18 is a sectional view showing a lens system of a structure of two lenses that is formed of a positive lens and a meniscus lens with a concave surface facing an object side.

An embodiment of the present invention will be described based on specific structural examples. FIG. 1 is a sectional view showing a typical structural example of an imaging lens according to the present invention. A light beam entering from an object side sequentially goes through an aperture stop 1 that is disposed closest to the object side in the system, a biconvex positive first lens 2, a negative meniscus second lens 3 with a concave surface facing the object side, and a positive meniscus third lens 4 with a convex surface facing the object side in this order so as to be focused on a light receiving surface of a imaging element 5. Cover glass or a low pass filter is provided between the third lens 4 and the imaging element 5, if necessary.

First, disposing the aperture stop 1 closest to the object side in the system or close behind the first lens 2 to the object side is a condition for decreasing the incident angle of a light beam to the imaging element 5 with the total length being kept small (however, although keeping the incident angle of the light beam small is a preferable condition for avoiding the reduction of relative illumination, it is not an essential condition since avoiding the reduction of relative illumination is also possible by the imaging element and a processing device). The lens system of the present invention is formed of three lenses as described above. When the lens system is divided into a front group and a rear group for convenience, the condition for keeping the total length short is that the front group is positive, and the rear group is negative or positive. Therefore, although the first lens 2 is a positive lens, there is the versatility in the combination of the second lens and the third lens. Thus, possible combinations of the three lenses are four combinations of positive-negative-positive, positive-positive-negative, positive-negative-negative, and positive-positive-positive that are in order from the first lens 2. The combination of positive-positive-positive can not achromatize with a combination of normal glass, so that it is kept out of the discussion. In addition, in the case of the combination of positive-negative-negative, since the negative power of the rear group is strong, the incident angle of a light beam to the imaging element 5 becomes large although the total length can be made short. In addition, the power of the first lens 2 is also strong, which is disadvantageous for aberration correction. Therefore, the preferable structure is the structure of positive-negative-positive or positive-positive-negative.

The basic structure can be determined as described above. Next, requirements regarding the shape and the position of each lens will be hereinafter described. Regarding the structure of positive-negative-positive, as the starting point of the design concept thereof, a structure has been considered where, in addition to the lens system of two lenses of a positive first lens and a meniscus second lens with a concave surface facing an object side that has been proposed by the present inventor, a positive third lens is provided on an image side as a natural expansion in order to increase versatility. As such a concept of increasing the versatility, there is an approach where a correction lens is added to a basic single lens as disclosed in Japanese laid-open publication No. 4-211214. In the present invention, the third lens 4 that is introduced to ensure the versatility is not used as such a correction lens but is actively utilized as an element that forms a lens system and provides large power. Thus, ensuring the versatility for responding to an increase in resolution is possible with a minimum increase in the number of lenses.

Next, the basic shape of each lens will be described. First, the shape of the first lens 2 is a biconvex shape basically since the first lens 2 has strong positive power. However, in the case of the structure of positive-positive-negative, since the positive power thereof is weakened, the first lens 2 may have a meniscus shape. Next, details about the second lens 3 will be described. Since the aperture stop 1 is disposed on the object side of the second lens 3 and the second lens 3 has a large incident angle of a light beam, if a surface on the image side of the second lens 3 is a concave surface, total reflection easily occurs and the versatility of designing is decreased. Therefore, the shape is preferable where a surface on the image side of the second lens 3 is a convex surface irrespective of the positive and negative nature of the second lens 3. Furthermore, regarding the shape of the third lens 4, the surface on the object side is preferably a convex surface in order to make maximum use of the versatility thereof. This is because the aperture stop 1 is disposed on the object side, each light beam is narrowed down at the third lens 4, and a light beam moving toward each image height is separated on the surface of the third lens 4. Namely, disposing a convex surface on the object side of the third lens 4 allows the separating effect on the convex surface to be increased, in addition, the third lens 4 is a biaspheric lens, and thereby field aberrations of each light beam can be effectively corrected.

As described above, the basic framework of the shapes and the positions of the lenses are determined. Next, details about achromatizing, which is indispensable to improving resolution, will be described. In memorized sequence, disposing glass with a small Abbe number as a negative lens enables achromatizing. Such glass is used as the second lens 3 in the case of the structure of positive-negative-positive, and as the third lens 4 in the case of the structure of positive-positive-negative. Furthermore, regarding the Abbe number of the negative lens, v min and the maximum Abbe number of the positive lenses, v max, the following condition is preferably satisfied for effective achromatize.

$$1.25<\nu\ max/\nu\ min$$

The basic structural requirements of the present invention were described hereinbefore. Next, details about additional conditions for providing a small and inexpensive imaging lens will be described.

As described hereinbefore, it is essential for effective aberration correction that the third lens 4 is a biaspheric lens. In addition, in order to satisfy the specification in a more balanced manner, disposing other aspheric surfaces effectively is necessary. In disposing an aspheric surface, there are following combinations: at least a single surface of the first lens or the second lens is an aspheric surface; at least one of the first and the second lenses is a biaspheric lens; or the like.

Furthermore, regarding the thickness of the thinnest part and the thickest part of at least a single biaspheric lens, satisfying the following condition enables field aberrations to be effectively corrected and enables a lens shape that is easily formed $$1.0<t\ max/t\ min<1.4$$

where t min and t max are the thinnest part and the thickest part. In addition, forming the lens shape where a plurality of points of inflection is included in the effective diameter in which a light beam goes through can reinforce the advantage. Such a lens shape is often adopted as the shape of a scanning sectional plane of a scanning optical system of a laser printer and the like. Although the F number thereof is small, it has a part with a similar role.

It is an important requirement for providing an inexpensive imaging lens that the lens system includes at least a single resin lens, and the lens shape with small difference of wall thickness as described above is preferable in view of formability.

Next, in the case of the structure of positive-positive-negative, the requirements about the basic shape of each lens are roughly the same. However, if the third lens 4 is a negative lens, glass with a smaller Abbe number needs to be selected as the power of the third lens 4 becomes strong. Meanwhile, glass with a relatively large Abbe number is preferably used as the second lens 3, which has positive power.

EXAMPLES

Next, examples of the present invention will be explained referring to specific number examples.

TABLE 1

| | radius of curvature | | distance | | refractive index | | dispersion | |
|---|---|---|---|---|---|---|---|---|
| | example 1 | | d0 | 0.245 | | | | |
| 1 | R1 | 2.769 | d1 | 1.261 | n1 | 1.533 | v1 | 55.3 |
| 2 | R2 | −1.702 | d2 | 0.528 | n2 | | v2 | |
| 3 | R3 | −0.764 | d3 | 0.700 | n3 | 1.935 | v3 | 20.9 |
| 4 | R4 | −1.699 | d4 | 0.100 | n4 | | v4 | |
| 5 | R5 | 1.177 | d5 | 0.990 | n5 | 1.533 | v5 | 55.3 |
| 6 | R6 | 1.944 | d6 | 0.526 | | | | |
| 7 | R7 | 0.000 | d7 | 0.550 | | glass | | |
| 8 | R8 | 0.000 | d8 | 0.500 | | | | |
| | example 2 | | d0 | 0.245 | | | | |
| 1 | R1 | 3.452 | d1 | 1.274 | n1 | 1.533 | v1 | 55.3 |
| 2 | R2 | −1.426 | d2 | 0.504 | n2 | | v2 | |
| 3 | R3 | −0.683 | d3 | 0.700 | n3 | 1.935 | v3 | 20.9 |
| 4 | R4 | −1.622 | d4 | 0.100 | n4 | | v4 | |
| 5 | R5 | 1.182 | d5 | 0.897 | n5 | 1.533 | v5 | 55.3 |
| 6 | R6 | 2.813 | d6 | 0.381 | | | | |
| 7 | R7 | 0.000 | d7 | 1.500 | | quartz | | |
| 8 | R8 | 0.000 | d8 | 0.400 | | | | |
| | example 3 | | d0 | 0.272 | | | | |
| 1 | R1 | 2.234 | d1 | 1.355 | n1 | 1.494 | v1 | 57.4 |
| 2 | R2 | −1.601 | d2 | 0.334 | n2 | | v2 | |
| 3 | R3 | −0.591 | d3 | 0.700 | n3 | 1.591 | v3 | 29.9 |
| 4 | R4 | −1.500 | d4 | 0.100 | n4 | | v4 | |
| 5 | R5 | 1.191 | d5 | 0.998 | n5 | 1.494 | v5 | 57.4 |
| 6 | R6 | 2.217 | d6 | 0.592 | | | | |
| 7 | R7 | 0.000 | d7 | 0.550 | | glass | | |
| 8 | R8 | 0.000 | d8 | 0.500 | | | | |
| | example 4 | | d0 | 0.279 | | | | |
| 1 | R1 | 2.531 | d1 | 1.412 | n1 | 1.494 | v1 | 57.4 |
| 2 | R2 | −1.210 | d2 | 0.269 | n2 | | v2 | |
| 3 | R3 | −0.513 | d3 | 0.700 | n3 | 1.591 | v3 | 29.9 |
| 4 | R4 | −1.791 | d4 | 0.100 | n4 | | v4 | |
| 5 | R5 | 1.041 | d5 | 0.943 | n5 | 1.494 | v5 | 57.4 |
| 6 | R6 | 3.482 | d6 | 0.397 | | | | |
| 7 | R7 | 0.000 | d7 | 1.500 | | quartz | | |
| 8 | R8 | 0.000 | d8 | 0.400 | | | | |
| | example 5 | | d0 | 0.162 | | | | |
| 1 | R1 | 3.783 | d1 | 1.438 | n1 | 1.560 | v1 | 67.3 |
| 2 | R2 | −2.512 | d2 | 0.864 | n2 | | v2 | |
| 3 | R3 | −1.076 | d3 | 0.743 | n3 | 1.935 | v3 | 20.9 |
| 4 | R4 | −2.028 | d4 | 0.100 | n4 | | v4 | |

TABLE 1-continued

| | radius of curvature | | distance | | refractive index | | dispersion | |
|---|---|---|---|---|---|---|---|---|
| 5 | R5 | 2.116 | d5 | 1.343 | n5 | 1.747 | ν5 | 49.3 |
| 6 | R6 | 2.707 | d6 | 0.500 | | | | |
| 7 | R7 | 0.000 | d7 | 0.550 | | glass | | |
| 8 | R8 | 0.000 | d8 | 0.500 | | | | |

Table 1 is a list showing configurations of examples 1 through 5 of the present invention. The numbers at the left end of the list correspond to each surface of the lenses. The numbers 1 and 2 correspond to a first surface and a second of the first lens 2, the numbers 3 and 4 to a first surface and a second surface of the second lens 3, the numbers 5 and 6 to a first surface and a second surface of the third lens 4, respectively. The numbers 7 and 8 correspond to cover glass and a quartz filter, respectively, which are not basic requirements. In addition, R, d, n, and ν correspond to radius of curvature, distance, refractive index, and Abbe number, respectively. d0 in the distance column shows the distance from the aperture stop to the first surface of the first lens in the case of a front diaphragm structure. Furthermore, although the imaging element 5 is not shown in the list, it is provided behind the surface 8 with air gap d8.

Table 2 is a list showing aspheric coefficients of each surface of examples 1 through 5. Although the aspheric surface of the present invention adopts the aspheric surface represented by Formula 1 for convenience, it is not limited to this formula, and increasing the versatility of the surface is important.

$$z = \frac{ch^2}{1 + \sqrt{1 - (1+k)c^2h^2}} + A_4h^4 + A_6h^6 + A_8h^8 + \ldots + A_{26}h^{26} \qquad \text{Formula 1}$$

Here, z in Formula 1 represents a depth in the direction of the optical axis from a reference plane having contact with the peak of the aspheric surface. In addition, c represents an inverse radius of curvature R and h represents the height from the optical axis of the surface. k is a conic constant representing a quadratic surface. A4 through A26 are coefficients of correcting aspheric surface.

TABLE 2

| | conic constant | A4 | A6 | A8 | A10 |
|---|---|---|---|---|---|
| | | | example 1 | | |
| 1 | 5.362 | −7.3826E−02 | −5.0942E−02 | 9.6256E−03 | −2.3069E−02 |
| 2 | −0.610 | 1.0463E−02 | −8.2613E−02 | 7.6919E−02 | −2.3103E−02 |
| 3 | −3.801 | −1.7693E−01 | 2.3600E−01 | −7.5670E−02 | 5.8149E−03 |
| 4 | −0.864 | 3.1700E−02 | 1.7762E−02 | 7.3159E−03 | |
| 5 | −4.765 | −2.9100E−02 | −3.9565E−03 | −6.4199E−04 | |
| 6 | −5.481 | −2.5241E−02 | −3.7595E−03 | | |
| 7 | | | | | |
| 8 | | | | | |
| | | | example 2 | | |
| 1 | 7.259 | −7.2313E−02 | −3.4592E−02 | −3.5803E−03 | −5.7549E−03 |
| 2 | −0.966 | 2.4995E−02 | −9.0525E−02 | 8.4082E−02 | −2.4110E−02 |
| 3 | −3.150 | −1.8020E−01 | 2.3327E−01 | −7.1303E−02 | 4.9074E−03 |
| 4 | −0.659 | 2.1339E−02 | 2.1011E−02 | 2.6381E−03 | |
| 5 | −4.883 | −2.0930E−02 | −4.3335E−03 | −7.9044E−04 | |
| 6 | −1.166 | −4.0212E−02 | −9.7669E−04 | | |
| 7 | | | | | |
| 8 | | | | | |
| | | | example 3 | | |
| 1 | 2.551 | −4.9813E−02 | −3.0579E−02 | −1.2902E−02 | 1.5992E−03 |
| 2 | −0.312 | −3.0082E−02 | −5.2543E−02 | 6.6327E−02 | −2.9310E−03 |
| 3 | −2.421 | −2.6712E−01 | 3.3888E−01 | −1.3097E−01 | 2.6653E−02 |
| 4 | −0.855 | 2.6529E−02 | 6.8041E−02 | −1.1766E−02 | |
| 5 | −4.823 | −2.7589E−03 | −4.1527E−03 | 1.9328E−04 | |
| 6 | −6.073 | −5.7519E−03 | −3.4220E−03 | | |
| 7 | | | | | |
| 8 | | | | | |
| | | | example 4 | | |
| 1 | 0.701 | −1.6366E−02 | −3.0229E−02 | 3.4752E−02 | −3.2382E−02 |
| 2 | −1.118 | 8.0036E−02 | −2.5596E−01 | 1.1574E−01 | 3.5640E−02 |
| 3 | −2.258 | −1.4258E−01 | −9.4048E−02 | 1.6586E−01 | −1.4416E−02 |
| 4 | −1.304 | −1.1503E−02 | 1.7890E−02 | 1.2420E−03 | |
| 5 | −4.565 | −5.5246E−03 | −3.3679E−03 | −2.9066E−03 | |
| 6 | 1.889 | −1.2921E−02 | −1.0671E−02 | | |
| 7 | | | | | |
| 8 | | | | | |
| | | | example 5 | | |
| 1 | 2.875 | −3.6795E−02 | −6.5976E−03 | −1.3121E−02 | 4.4209E−03 |
| 2 | 0.000 | −1.7428E−02 | −1.4250E−02 | 7.3658E−03 | −1.7860E−03 |
| 3 | −4.439 | −1.0134E−01 | 1.0158E−01 | −2.8541E−02 | 3.0232E−03 |
| 4 | −0.971 | 1.7402E−02 | 1.1071E−02 | 2.5044E−03 | |

TABLE 2-continued

| | conic constant | A4 | A6 | A8 | A10 |
|---|---|---|---|---|---|
| 5 | −9.853 | −1.7358E−02 | −2.6831E−03 | 3.4205E−04 | |
| 6 | −9.040 | −1.6385E−03 | −6.2622E−04 | | |
| 7 | | | | | |
| 8 | | | | | |

All five examples have front diaphragm structures and positive-negative-positive, and all lenses thereof are bias-pheric lenses. Among the examples, in examples 1 and 2, the first lens and the third lens are formed of resin, in examples 3 and 4, all lenses are formed of resin, and in example 5, all lenses are formed of glass. In example 2, a low pass filter is disposed in front of the image surface.

Next, Table 3 is a list showing configuration parameters of examples 6 through 10 of the present invention.

TABLE 3

| | radius of curvature | | distance | | refractive index | | dispersion | |
|---|---|---|---|---|---|---|---|---|
| | example 6 | | d0 | 0.100 | | | | |
| 1 | R1 | 2.936 | d1 | 2.058 | n1 | 1.747 | ν1 | 49.3 |
| 2 | R2 | −5.997 | d2 | 0.323 | n2 | | ν2 | |
| 3 | R3 | −1.526 | d3 | 0.800 | n3 | 1.935 | ν3 | 20.9 |
| 4 | R4 | −3.108 | d4 | 0.100 | n4 | | ν4 | |
| 5 | R5 | 2.247 | d5 | 1.474 | n5 | 1.533 | ν5 | 55.3 |
| 6 | R6 | 4.186 | d6 | 0.296 | | | | |
| 7 | R7 | 0.000 | d7 | 0.550 | | glass | | |
| 8 | R8 | 0.000 | d8 | 0.500 | | | | |
| | example 7 | | d0 | 0.298 | | | | |
| 1 | R1 | 2.084 | d1 | 1.576 | n1 | 1.499 | ν1 | 81.6 |
| 2 | R2 | −5.581 | d2 | 0.440 | n2 | | ν2 | |
| 3 | R3 | −0.996 | d3 | 0.800 | n3 | 1.653 | ν3 | 33.8 |
| 4 | R4 | −1.629 | d4 | 0.100 | n4 | | ν4 | |
| 5 | R5 | 1.949 | d5 | 1.250 | n5 | 1.533 | ν5 | 55.3 |
| 6 | R6 | 2.224 | d6 | 0.551 | | | | |
| 7 | R7 | 0.000 | d7 | 0.550 | | glass | | |
| 8 | R8 | 0.000 | d8 | 0.500 | | | | |
| | example 8 | | d0 | 0.287 | | | | |

TABLE 3-continued

| | radius of curvature | | distance | | refractive index | | dispersion | |
|---|---|---|---|---|---|---|---|---|
| 1 | R1 | 2.096 | d1 | 1.700 | n1 | 1.533 | ν1 | 55.3 |
| 2 | R2 | −5.900 | d2 | 0.411 | n2 | | ν2 | |
| 3 | R3 | −1.044 | d3 | 0.800 | n3 | 1.935 | ν3 | 20.9 |
| 4 | R4 | −1.842 | d4 | 0.100 | n4 | | ν4 | |
| 5 | R5 | 1.674 | d5 | 1.200 | n5 | 1.533 | ν5 | 55.3 |
| 6 | R6 | 2.365 | d6 | 0.653 | | | | |
| 7 | R7 | 0.000 | d7 | 0.550 | | glass | | |
| 8 | R8 | 0.000 | d8 | 0.500 | | | | |
| | example 9 | | d0 | 0.101 | | | | |
| 1 | R1 | 4.917 | d1 | 0.960 | n1 | 1.533 | ν1 | 55.3 |
| 2 | R2 | −2.751 | d2 | 0.278 | n2 | | ν2 | |
| 3 | R3 | −1.782 | d3 | 0.800 | n3 | 1.935 | ν3 | 20.9 |
| 4 | R4 | −3.437 | d4 | 0.100 | n4 | | ν4 | |
| 5 | R5 | 1.388 | d5 | 1.200 | n5 | 1.533 | ν5 | 55.3 |
| 6 | R6 | 1.617 | d6 | 1.354 | | | | |
| 7 | R7 | 0.000 | d7 | 0.550 | | glass | | |
| 8 | R8 | 0.000 | d8 | 0.500 | | | | |
| | example 10 | | d0 | 0.515 | | | | |
| 1 | R1 | 3.214 | d1 | 1.737 | n1 | 1.810 | ν1 | 39.6 |
| 2 | R2 | −1.104 | d2 | 0.137 | n2 | | ν2 | |
| 3 | R3 | −0.621 | d3 | 0.883 | n3 | 1.935 | ν3 | 20.9 |
| 4 | R4 | −2.247 | d4 | 0.303 | n4 | | ν4 | |
| 5 | R5 | 1.429 | d5 | 1.098 | n5 | 1.533 | ν5 | 55.3 |
| 6 | R6 | 2.515 | d6 | 0.476 | | | | |
| 7 | R7 | 0.000 | d7 | 0.550 | | glass | | |
| 8 | R8 | 0.000 | d8 | 0.500 | | | | |

Table 4 is a list showing aspheric coefficients corresponding to examples 6 through 10 of Table 3.

TABLE 4

| | conic constant | A4 | A6 | A8 | A10 |
|---|---|---|---|---|---|
| | | | example 6 | | |
| 1 | 0.660 | −8.8836E−03 | −5.7558E−03 | 1.4681E−02 | −1.3476E−02 |
| 2 | −4.691 | −1.0595E−01 | 6.2849E−02 | −6.1002E−02 | 1.6064E−02 |
| 3 | | | | | |
| 4 | | | | | |
| 5 | −23.521 | 8.8784E−02 | −1.1321E−01 | 5.3276E−02 | −1.2695E−02 |
| 6 | −8.250 | 3.7613E−03 | 2.3259E−04 | −2.6444E−03 | 3.0056E−04 |
| 7 | | | | | |
| 8 | | | | | |
| | | | example 7 | | |
| 1 | | | | | |
| 2 | | | | | |
| 3 | −2.922 | −7.1558E−02 | 5.1636E−02 | −4.9006E−03 | −2.7308E−03 |
| 4 | −1.603 | 1.1023E−02 | 8.1925E−03 | 3.2431E−03 | |
| 5 | −5.436 | −1.4588E−02 | −1.9811E−03 | 9.0889E−05 | |
| 6 | −5.301 | −1.2391E−02 | −1.3507E−03 | | |
| 7 | | | | | |
| 8 | | | | | |

TABLE 4-continued

| | conic constant | A4 | A6 | A8 | A10 |
|---|---|---|---|---|---|
| | | | example 8 | | |
| 1 | | | | | |
| 2 | | | | | |
| 3 | −3.331 | −7.5100E−02 | 4.9618E−02 | −2.2415E−03 | −3.3791E−03 |
| 4 | −1.809 | 5.4701E−03 | 6.4511E−03 | 2.7194E−03 | |
| 5 | −4.658 | −4.0256E−03 | −1.5632E−03 | 1.1699E−04 | |
| 6 | −5.171 | −6.3851E−03 | −1.3832E−03 | | |
| 7 | | | | | |
| 8 | | | | | |
| | | | example 9 | | |
| 1 | −32.376 | −4.8001E−02 | −6.4167E−02 | | |
| 2 | 0.000 | −1.3043E−01 | 4.2167E−02 | | |
| 3 | −7.014 | 5.2237E−03 | 7.0982E−03 | 8.0073E−02 | −4.7735E−02 |
| 4 | −4.112 | 2.0779E−02 | 2.3514E−02 | 1.2526E−03 | |
| 5 | −4.035 | 1.4910E−02 | −9.5861E−03 | 1.8989E−03 | |
| 6 | −1.553 | −2.2334E−02 | 4.1634E−04 | 6.7091E−04 | −7.0422E−05 |
| 7 | | | | | |
| 8 | | | | | |
| | | | example 10 | | |
| 1 | −0.977 | 2.7064E−03 | −1.6052E−02 | | |
| 2 | −4.088 | 3.8682E−02 | −2.0943E−01 | 1.4204E−01 | −2.0289E−02 |
| 3 | −2.936 | −5.9906E−02 | −2.0033E−03 | 3.0355E−02 | 1.2816E−03 |
| 4 | −8.182 | −4.4737E−02 | 3.3590E−02 | −3.1192E−03 | |
| 5 | −5.441 | −4.9849E−02 | −3.0238E−03 | −2.0829E−03 | |
| 6 | −2.687 | −3.8208E−02 | −7.8511E−04 | | |
| 7 | | | | | |
| 8 | | | | | |

Among examples 6 through 10, the second lens of example 6 and the first lens of examples 7 and 8 are formed of a spherical surface. In addition, all examples include a resin lens. Furthermore, in example 9, the aperture stop is disposed close behind the second lens, and d0 represents the distance not from the aperture stop to the first lens but from a dummy surface to the first lens.

Table 5 is a list showing configuration parameters of examples 11 through 15 of the present invention.

TABLE 5

| | radius of curvature | | distance | | refractive index | | dispersion | |
|---|---|---|---|---|---|---|---|---|
| | example 11 | | d0 | 0.299 | | | | |
| 1 | R1 | 1.910 | d1 | 1.403 | n1 | 1.494 | ν1 | 57.4 |
| 2 | R2 | −1.439 | d2 | 0.235 | n2 | | ν2 | |
| 3 | R3 | −0.561 | d3 | 0.700 | n3 | 1.659 | ν3 | 39.7 |
| 4 | R4 | −1.524 | d4 | 0.100 | n4 | | ν4 | |
| 5 | R5 | 1.149 | d5 | 1.029 | n5 | 1.494 | ν5 | 57.4 |
| 6 | R6 | 2.347 | d6 | 0.619 | | | | |
| 7 | R7 | 0.000 | d7 | 0.550 | | glass | | |
| 8 | R8 | 0.000 | d8 | 0.500 | | | | |
| | example 12 | | d0 | 0.430 | | | | |
| 1 | R1 | 2.796 | d1 | 1.634 | n1 | 1.494 | ν1 | 57.4 |
| 2 | R2 | −1.163 | d2 | 0.324 | n2 | | ν2 | |
| 3 | R3 | −0.456 | d3 | 0.700 | n3 | 1.591 | ν3 | 29.9 |
| 4 | R4 | −2.632 | d4 | 0.100 | n4 | | ν4 | |
| 5 | R5 | 0.846 | d5 | 1.225 | n5 | 1.494 | ν5 | 57.4 |
| 6 | R6 | 12.446 | d6 | 0.338 | | | | |
| 7 | R7 | 0.000 | d7 | 1.500 | glass | | | |
| 8 | R8 | 0.000 | d8 | 0.400 | | | | |
| | example 13 | | d0 | 0.622 | | | | |

TABLE 5-continued

| | radius of curvature | | distance | | refractive index | | dispersion | |
|---|---|---|---|---|---|---|---|---|
| 1 | R1 | 2.490 | d1 | 1.381 | n1 | 1.606 | ν1 | 65.5 |
| 2 | R2 | −113.237 | d2 | 0.588 | n2 | | ν2 | |
| 3 | R3 | −1.452 | d3 | 0.800 | n3 | 1.935 | ν3 | 20.9 |
| 4 | R4 | −2.317 | d4 | 0.100 | n4 | | ν4 | |
| 5 | R5 | 1.669 | d5 | 1.200 | n5 | 1.606 | ν5 | 65.5 |
| 6 | R6 | 2.168 | d6 | 0.826 | | | | |
| 7 | R7 | 0.000 | d7 | 0.550 | | glass | | |
| 8 | R8 | 0.000 | d8 | 0.500 | | | | |
| | example 14 | | d0 | 0.536 | | | | |
| 1 | R1 | 2.192 | d1 | 1.581 | n1 | 1.499 | ν1 | 81.6 |
| 2 | R2 | −5.484 | d2 | 0.501 | n2 | | ν2 | |
| 3 | R3 | −1.057 | d3 | 0.800 | n3 | 1.591 | ν3 | 29.9 |
| 4 | R4 | −1.169 | d4 | 0.152 | n4 | | ν4 | |
| 5 | R5 | 3.946 | d5 | 1.199 | n5 | 1.591 | ν5 | 29.9 |
| 6 | R6 | 1.709 | d6 | 0.397 | | | | |
| 7 | R7 | 0.000 | d7 | 0.550 | | glass | | |
| 8 | R8 | 0.000 | d8 | 0.500 | | | | |
| | example 15 | | d0 | 0.712 | | | | |
| 1 | R1 | 2.561 | d1 | 1.591 | n1 | 1.499 | ν1 | 81.6 |
| 2 | R2 | 127.840 | d2 | 0.664 | n2 | | ν2 | |
| 3 | R3 | −3.026 | d3 | 0.724 | n3 | 1.747 | ν3 | 49.3 |
| 4 | R4 | −1.307 | d4 | 0.100 | n4 | | ν4 | |
| 5 | R5 | 12.888 | d5 | 0.990 | n5 | 1.935 | ν5 | 20.9 |
| 6 | R6 | 1.911 | d6 | 0.668 | | | | |
| 7 | R7 | 0.000 | d7 | 0.550 | | glass | | |
| 8 | R8 | 0.000 | d8 | 0.500 | | | | |

Table 6 is a list showing aspheric coefficients corresponding to examples 11 through 15 of Table 5.

TABLE 6

| | conic constant | A4 | A6 | A8 | A10 |
|---|---|---|---|---|---|
| | | | example 11 | | |
| 1 | 2.112 | −4.9972E−02 | −2.1125E−02 | −2.1498E−02 | −1.0551E−02 |
| 2 | −0.261 | −3.2111E−02 | −9.9061E−02 | 7.7325E−02 | 2.6413E−02 |
| 3 | −2.240 | −2.9392E−01 | 3.1603E−01 | −1.3578E−01 | 5.0040E−02 |
| 4 | −0.855 | 2.6745E−02 | 6.7556E−02 | −1.2164E−02 | |
| 5 | −4.637 | 2.1345E−03 | −3.8590E−03 | 3.1099E−04 | |
| 6 | −5.563 | −3.4191E−03 | −2.8100E−03 | | |
| 7 | | | | | |
| 8 | | | | | |
| | | | example 12 | | |
| 1 | 1.086 | −1.1186E−02 | −2.7202E−02 | 2.8928E−02 | −2.3129E−02 |
| 2 | −1.575 | 9.2259E−02 | −2.6806E−01 | 1.0345E−01 | 2.9389E−02 |
| 3 | −2.310 | −1.5993E−01 | −1.0088E−01 | 1.6131E−01 | −2.0008E−02 |
| 4 | 0.477 | −4.1031E−02 | 3.1040E−02 | −7.7272E−04 | |
| 5 | −4.061 | 8.7774E−03 | 5.0615E−05 | −8.5303E−04 | |
| 6 | 26.238 | 2.4053E−02 | −7.5315E−03 | | |
| 7 | | | | | |
| 8 | | | | | |
| | | | example 13 | | |
| 1 | −0.240 | −4.3621E−03 | 6.3679E−04 | −5.0651E−04 | |
| 2 | 0.000 | 2.6236E−03 | −5.3920E−03 | 4.8614E−04 | |
| 3 | −6.332 | −4.6225E−02 | 5.8746E−02 | −2.0659E−02 | 2.6978E−03 |
| 4 | −0.601 | 2.0408E−02 | 1.5446E−02 | −3.2338E−04 | |
| 5 | −5.502 | 6.0663E−03 | −2.6301E−04 | 5.0939E−05 | |
| 6 | −6.116 | −2.6399E−03 | 4.7710E−04 | | |
| 7 | | | | | |
| 8 | | | | | |
| | | | example 14 | | |
| 1 | −0.315 | −6.8595E−04 | −1.5149E−03 | | |
| 2 | 0.000 | −7.8619E−03 | −4.5607E−03 | | |
| 3 | −2.215 | −4.5827E−02 | 5.0657E−02 | −8.5412E−03 | −9.7903E−04 |
| 4 | −1.864 | 1.3840E−02 | 1.1774E−02 | 3.3646E−03 | |
| 5 | −8.283 | −1.8540E−02 | −2.4519E−03 | 7.6150E−05 | |
| 6 | −8.338 | −1.1582E−02 | −1.0508E−03 | | |
| 7 | | | | | |
| 8 | | | | | |
| | | | example 15 | | |
| 1 | −0.899 | −8.3599E−03 | 1.2552E−03 | −4.8662E−04 | −3.9500E−04 |
| 2 | 0.000 | −1.3908E−02 | −2.9647E−03 | −9.7822E−04 | |
| 3 | −2.579 | −3.9990E−02 | 4.5608E−02 | −9.1653E−03 | 5.5428E−04 |
| 4 | −2.572 | −8.6580E−03 | 1.0179E−02 | 3.6826E−03 | |
| 5 | 4.320 | 5.5607E−03 | −1.0275E−02 | 8.3805E−04 | |
| 6 | −8.046 | −1.4456E−02 | −2.7133E−04 | | |
| 7 | | | | | |
| 8 | | | | | |

Examples 14 and 15 are examples of the structure of positive-positive-negative. Both examples have the structure where the third lens is formed of glass with a small Abbe number.

Finally, the relationships of focal length and each parameter regarding examples 1 through 15 will be shown in Table 7 as a list. In Table 7, "incident angle" represents an incident angle of a principal ray of a light beam of the maximum angle of view to the lens system, and "emission angle" represents an emission angle of the same principal ray from the lens system. f represents focal length, f1, f2, and f3 represent each focal length of the first lens, the second lens, and the third lens, and v1, v2, and v3 represent each Abbe number of those. L represents total length from the end of the lens (the aperture stop, in the case of front diaphragm) to the imaging surface, tmx/tmn#2 represents the ratio of wall thickness of the second lens, and tmx/t mn#3 represents the ratio of wall thickness of the third lens.

TABLE 7

| example No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Fno | 2.74 | 2.75 | 2.74 | 2.75 | 2.50 | 2.55 | 2.49 | 2.49 | 2.70 | 2.79 | 3.00 | 3.02 | 2.52 | 2.77 | 2.77 |
| focal length | 3.28 | 3.28 | 3.28 | 3.28 | 3.88 | 3.83 | 3.88 | 3.89 | 3.93 | 3.30 | 3.28 | 3.28 | 3.89 | 3.93 | 3.89 |
| incident angle | 32.5 | 32.5 | 32.5 | 32.5 | 32.5 | 32.5 | 32.5 | 32.5 | 32.5 | 31.9 | 32.5 | 32.5 | 32.5 | 32.5 | 32.5 |
| emission angle | 18.7 | 19.5 | 20.0 | 18.7 | 20.0 | 20.0 | 20.0 | 18.3 | 39.4 | 20.0 | 20.0 | 8.9 | 20.0 | 22.0 | 27.0 |
| f1 | 2.19 | 2.08 | 2.14 | 1.89 | 2.94 | 2.93 | 3.27 | 3.13 | 3.46 | 1.24 | 1.93 | 1.92 | 4.04 | 3.37 | 5.22 |

TABLE 7-continued

| example No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| f2 | −2.33 | −1.97 | −2.31 | −1.53 | −3.93 | −4.24 | −7.83 | −5.00 | −5.16 | −1.24 | −1.89 | −1.06 | −7.52 | 11.26 | 2.61 |
| f3 | 3.86 | 3.21 | 3.94 | 2.66 | 6.57 | 7.20 | 11.45 | 6.70 | 6.52 | 4.59 | 3.55 | 1.78 | 6.28 | −6.38 | −2.51 |
| f/f1 | 1.50 | 1.58 | 1.54 | 1.73 | 1.32 | 1.31 | 1.19 | 1.24 | 1.14 | 2.67 | 1.70 | 1.70 | 0.98 | 1.17 | 0.75 |
| f/f2 | −1.41 | −1.67 | −1.42 | −2.14 | −0.99 | −0.90 | −0.50 | −0.78 | −0.76 | −2.65 | −1.73 | −3.09 | −0.52 | 0.35 | 1.49 |
| f/f3 | 0.85 | 1.02 | 0.83 | 1.23 | 0.59 | 0.53 | 0.34 | 0.58 | 0.60 | 0.72 | 0.92 | 1.85 | 0.62 | −0.62 | −1.55 |
| f2/f3 | −1.66 | −1.63 | −1.71 | −1.74 | −1.67 | −1.70 | −1.46 | −1.34 | −1.26 | −3.69 | −1.88 | −1.67 | −0.83 | −0.57 | −0.96 |
| v3 | 55.3 | 55.3 | 57.4 | 57.4 | 49.3 | 55.3 | 55.3 | 55.3 | 55.3 | 55.3 | 57.4 | 57.4 | 65.5 | 29.9 | 20.9 |
| (v1 + v3)/v2 | 5.29 | 5.29 | 3.84 | 3.84 | 5.58 | 5.00 | 4.05 | 5.29 | 5.29 | 4.54 | 2.89 | 3.84 | 6.27 | 3.73 | 2.08 |
| vmax/vmin | 2.65 | 2.65 | 1.92 | 1.92 | 3.22 | 2.65 | 2.41 | 2.65 | 2.65 | 2.65 | 1.45 | 1.92 | 3.13 | 2.73 | 3.90 |
| L/f | 1.59 | 1.67 | 1.59 | 1.68 | 1.55 | 1.57 | 1.52 | 1.55 | 1.44 | 1.82 | 1.60 | 1.88 | 1.64 | 1.54 | 1.62 |
| tmx/tmn#2 | 1.23 | 1.21 | 1.45 | 1.44 | 1.24 | 1.20 | 1.33 | 1.26 | 1.09 | 1.38 | 1.48 | 1.65 | 1.24 | 1.36 | 1.52 |
| tmx/tmn#3 | 1.24 | 1.26 | 1.25 | 1.35 | 1.11 | 1.11 | 1.13 | 1.26 | 1.08 | 1.03 | 1.28 | 2.22 | 1.30 | 1.14 | 1.30 |

Advantage of the Invention

According to the present invention, a small and inexpensive imaging lens system with a small incident angle of a light beam to an imaging device, short total length, and an angle of view over 30 degrees can be realized.

What is claimed is:

1. An imaging lens, comprising:

a lens system, the lens system including, in order from an object side:

a positive first lens with a convex surface facing the object side;

an aperture stop provided on one of the object side and an image side of the first lens;

a meniscus second lens with a concave surface facing the object side; and a meniscus third lens with a convex surface facing the object side;

wherein:

at least one of the first lens and the second lens includes an aspheric surface;

the third lens is a biaspheric lens;

the second lens and the third lens have paraxial focal lengths with different signs;

the following condition is satisfied, $$1.25<v\ max/v\ min,$$

where v max and v min are a maximum Abbe number and a minimum Abbe number among the lenses, respectively; and at least one biaspheric lens of the lens system satisfies the following condition, $$1.0t\ max/t\ min<1.4,$$

where t min and t max are thicknesses of a thinnest part and a thickest part of the biaspheric lens, respectively, measured parallel to an optical axis in an effective diameter in which a light beam passes through.

2. The imaging lens according to claim 1, wherein:

at least one of the first lens and the second lens of the lens system is a biaspheric lens.

3. The imaging lens according to claim 1, wherein:

any aspheric surface of a biaspheric lens of the lens system includes a plurality of points of inflection in an effective diameter in which a light beam passes through.

4. The imaging lens according to claim 1, wherein:

the aperture stop of the lens system is provided on the object side of the first lens.

5. The imaging lens according to claim 1, wherein:

the lens system includes at least a single resin lens.

6. The imaging lens according to claim 1, wherein:

the following condition is satisfied, $$L/f<2.0,$$

where L and f are a total length of the lens system and a focal length of the lens system, respectively.

7. An imaging lens, comprising, in order from an object side:

an aperture stop;

a biconvex positive first lens;

a negative meniscus second lens with a concave surface facing the object side; and a positive meniscus third lens with a convex surface facing the object side, wherein:

at least one of the first lens and the second lens includes an aspheric surface;

the third lens is a biaspheric lens; and the following condition is satisfied, $$2.5<(v\mathbf{1}+v\mathbf{3})/v\mathbf{2},$$

where v1, v2, and v3 are Abbe numbers of the first lens, the second lens, and the third lens, respectively.

8. An imaging lens, comprising, in order from an object side:

an aperture stop;

a positive first lens with a convex surface facing the object side;

a positive meniscus second lens with a concave surface facing the object side;

a negative meniscus third lens with a convex surface facing the object side, wherein:

at least one of the first lens and the second lens includes an aspheric surface;

the third lens is a biaspheric lens; and the following condition is satisfied, $$v\mathbf{3}<45,$$

where v3 is an Abbe number of the third lens.

* * * * *

UNITED STATES PATENT AND TRADEMARK OFFICE

CERTIFICATE OF CORRECTION

PATENT NO. : 6,970,306 B2
APPLICATION NO. : 10/761146
DATED : November 29, 2005
INVENTOR(S) : Eiki Matsuo It is certified that error appears in the above-identified patent and that said Letters Patent is hereby corrected as shown below:

| | |
|---|---|
| Column 8, TABLE 2, example 5, line 2, col. 3: | "-1.7428E-02" should be -- -1.7248E-02 -- |
| Column 9, TABLE 2 continued, line 2, col. 3: | "-1.6385E-.03" should be -- -1.6385E-02 -- |
| Column 11, TABLE 4 continued, example 9, line 5, col. 4: | "-9.5861E-03" should be -- -9.5681E-03 -- |
| Column 13, TABLE 6, example 11, line 2, col. 6: | "2.6413E-02" should be -- 3.6413E-02 -- |
| Column 13, TABLE 6, example 12, line 6, col. 2: | "26.238" should be -- 26.328 -- |
| Column 13, TABLE 6, example 14, line 2, col. 3: | "-7.8619E-03" should be -- -7.8916E-03 -- |
| Column 15, TABLE 7 continued, under example No. 13, line 3: | "0.98" should be -- 0.96 -- |
| Column 15, TABLE 7 continued, last line, col. 3: | "1.26" should be -- 1.28 -- |
| Column 15, Line 50, claim 1: | "1.0t" should be -- 1.0 < t -- |

Signed and Sealed this

Twenty-seventh Day of February, 2007

JON W. DUDAS
*Director of the United States Patent and Trademark Office*